United States Patent [19]

Frank

[11] Patent Number: 4,650,558

[45] Date of Patent: Mar. 17, 1987

[54] SEMICONDUCTOR ELECTRODE WITH IMPROVED PHOTOSTABILITY CHARACTERISTICS

[75] Inventor: Arthur J. Frank, Lakewood, Colo.

[73] Assignee: The United States of America as represented by the United States Department of Energy, Washington, D.C.

[21] Appl. No.: 702,715

[22] Filed: Feb. 19, 1985

[51] Int. Cl.⁴ .................. C25B 9/00; C25B 11/04
[52] U.S. Cl. .................... 204/242; 204/128; 204/129; 204/290 R; 204/DIG. 3; 429/111
[58] Field of Search ............... 204/242, 290 R, 128, 204/129, 79, 80, DIG. 3; 429/111

[56] References Cited

U.S. PATENT DOCUMENTS 4,379,740  4/1983  Nazzal et al. .................. 204/129
4,461,691  7/1984  Frank ............................ 204/242

OTHER PUBLICATIONS

K. Honda and A. J. Frank, *J. Phys. Chem.*, vol. 88, pp. 5577–5582 (Nov. 1984).
G. Horowitz et al., *J. Electrochem. Soc.*, vol. 131, pp. 151–156 (Jan. 1984).
K. Rajeshwar et al., *J. Electrochem. Soc.*, vol. 130, pp. 38–43 (Jan. 1983).
A. J. Frank et al., Extended Abstract No. 616, Electrochemical Society Meeting, Montreal, Canada, May 1982.
R. Noufi, *J. Electrochem. Soc.*, vol. 130, pp. 2126–2128 (1983).
A. J. Frank et al., *J. Electroanal. Chem.*, vol. 150, pp. 673–678 (1983).
A. F. Diaz et al., *J. Chem. Soc. Chem. Communications*, pp. 635–636 (1979).
K. K. Kanazawa et al., *Synthetic Metals*, vol. 1, pp. 329–336 (1979/1980).
A. F. Diaz et al., *IBM J. Res. Dev.*, vol. 25, pp. 42–47 (1981).
R. Noufi et al., *J. Am. Chem. Soc.*, vol. 103, pp. 1849–1850 (1981).
F. R. F. Fan et al., *J. Electrochem. Soc.*, vol. 128, pp. 2042–2045 (1981).
T. Skotheim et al., *J. Electrochem. Soc.*, vol. 128, pp. 1625–1626 (1981).
T. Skotheim et al., *J. Electrochem. Soc.*, vol. 129, pp. 1737–1741 (1982).

*Primary Examiner*—Aaron Weisstuch
*Attorney, Agent, or Firm*—Kenneth L. Richardson; James W. Weinberger; Judson R. Hightower

[57] ABSTRACT

An electrode is disclosed for use in photoelectrochemical cells having an electrolyte which includes an aqueous constituent. The electrode includes a semiconductor and a hydrophobic film disposed between the semiconductor and the aqueous constituent. The hydrophobic film is adapted to permit charges to pass therethrough while substantially decreasing the activity of the aqueous constituent at the semiconductor surface thereby decreasing the photodegradation of the semiconductor electrode.

10 Claims, 4 Drawing Figures

SEMICONDUCTOR ELECTRODE WITH IMPROVED PHOTOSTABILITY CHARACTERISTICS

CONTRACTUAL ORIGIN OF THE INVENTION

The U.S. Government has rights in this invention under Contract No. DE-AC02-83CH10093 between the U.S. Department of Energy and the Solar Energy Research Institute, a Division of the Midwest Research Institute.

BACKGROUND OF THE INVENTION

1. Field of the Invention

The present invention relates to the field of electrochemistry and, more particularly, to photoelectrochemical cells having coated semiconductor electrodes which enhance the efficiency of the photoelectrochemical cell. More specifically, the present invention relates to protective coatings for semiconductor electrodes to eliminate or substantially reduce the photocorrosion of the electrodes in an aqueous electrolyte environment.

2. Description of the Prior Art

The field of photoelectrochemistry is recognized as having the potential to enable solar energy utilization to meet many of the energy needs of the future. Through the action of light, photoelectrochemical cells can be used to generate electric power and/or to synthesize fuels and desired chemicals from abundant, renewable resources such as water, nitrogen, and carbon dioxide.

Photoelectrochemical cells can be configured such that one or both electrodes are photoactive semiconductors. The electrodes are in contact with the electrolyte which may be in liquid form. A junction is formed at the semiconductor-electrolyte interface in the dark as the two phases come into electronic equilibrium such that the Fermi level of the semiconductor, $E_f$, equals the electrochemical potential of the solution, $E_{redox}$, thereby producing a barrier height which depends on the nature of the solution species and the specific semiconductor. On illumination of the semiconductor with light energy equal to or greater than that of the semiconductor band gap, electrons are promoted from the valence band to the conduction band, creating electron-hole pairs at or near the interface. The electron-hole pairs are spatially separated by the semiconductor junction barrier and are injected into the electrolyte at the respective electrodes to produce electrochemical oxidation and reduction reactions.

A major impediment to the exploitation of photoelectrochemical cells in solar energy conversion and storage is the susceptibility of small band gap semiconductor materials to photoanodic and photocathodic degradation. The photoinstability is particularly severe for small band gap semiconductors where the photogenerated holes, which reach the interface, can oxidize the semiconductor itself. In fact, all known semiconducting materials are predicted to exhibit thermodynamic instability towards anodic photodegradation. Whether or not an electrode is photostable, then, depends on the competitive rates of the thermodynamically possible reactions, namely the semiconductor decomposition reaction and the electrolyte reactions.

Examples of photoanodic decomposition reactions are illustrated in Table I.

TABLE I

Examples of Photoanodic Decomposition Reactions of Various Semiconductor Electrodes

| Semiconductor | Decomposition Photoanodic Process |
|---|---|
| Si | $Si + 4h^+ + 2H_2O \rightarrow SiO_2 + 4H^+$ |
| GaAs | $GaAs + 6h^+ + 5H_2O \rightarrow Ga(OH)_3 + HAsO_2 + 6H^+$ |
| GaP | $GaP + 6h^+ + 6H_2O \rightarrow Ga(OH)_3 + H_3PO_3 + 6H^+$ |
| CdS | $CdS + 2h^+ \rightarrow Cd^{2+} + S$ |
| CdSe | $CdSe + 2h^+ \rightarrow Cd^{2+} + Se$ |
| MoS$_2$ | $MoS_2 + 18h^+ + 12H_2O \rightarrow MoO_3^{2-} + 2SO_4^{2-} + 24H^+$ |
| WO$_3$ | $WO_3 + 2h^+ + 2H_2O \rightarrow WO_4^{2-} + \frac{1}{2}O_2 + 4H^+$ |

The range of approaches for suppression of the photocorrosion problem in cells for chemical production is more restricted than that for electricity generating cells. This is particularly true if the electrolyte contains an aqueous constituent. Table II illustrates some examples of typical fuel producing reactions in aqueous electrolytes.

TABLE II

Some endergonic fuel generation reactions starting with $N_2$, $CO_2$, and $H_2O$

| Reaction | H° (kJ mol$^{-1}$)$^a$ | G° (kJ mol$^{-1}$)$^a$ |
|---|---|---|
| $H_2O(L) \rightarrow H_2(g) + \frac{1}{2}O_2(g)$ | 286 | 237 |
| $CO_2(g) + H_2O(L) \rightarrow HCOOH(L) + \frac{1}{2}O_2(g)$ | 270 | 286 |
| $CO_2(g) + H_2O(L) \rightarrow HCHO(g) + O_2(g)$ | 563 | 522 |
| $CO_2(g) + 2H_2O(L) \rightarrow CH_3OH(L) + 3/2O_2(g)$ | 727 | 703 |
| $CO_2(g) + 2H_2O(L) \rightarrow CH_4(g) + 2O_2(g)$ | 890 | 818 |
| $N_2(g) + 3H_2O(L) \rightarrow 2NH_3(g) + 3/2O_2(g)$ | 765 | 678 |
| $CO_2(g) + H_2O(L) \rightarrow 1/6C_6H_{12}O_6(s) + O_2(g)$ | 467 | 480 |

1 eV = 23.06 K cal/mol = 96.485 kJ/mol
1 J. = 0.23901 cal

Water is a particularly attractive source of hydrogen for the reduction of the materials $N_2$ and $CO_2$ as well as for the direct generation of $H_2$. Water can only be used, however, if the semiconductor electrodes are stable in its presence. In the example set forth in Table II, the production of energy rich materials such as $H_2$, $CH_3OH$, $CH_2O$, $CH_2O_2$, and $NH_3$, is associated with $O_2$ evolution. A major problem in photoelectrochemistry is that the oxidation of water at the photoanode of non-oxide n-type materials is thermodynamically and kinetically disfavored over the reaction of the valence-band holes with the semiconductor lattice. In fact, all known non-oxide and many oxide n-type photoanodes are susceptible to photodegradation in aqueous electrolytes.

A number of approaches have been used to control the photoinstability of the semiconductor-electrolyte interface by coating the semiconductor surface. For example, to stabilize semiconductor surfaces from photodecomposition, noncorroding layers of metals or relatively stable semiconductor films have been deposited onto the electrode surfaces. It has been reported that continuous metal films which block solvent penetration can protect n-type GaP electrodes from photocorrosion. However, if the films are too thick for the photogenerated holes to penetrate without being scattered, they assume the Fermi energy of the metal. Then, the system is equivalent to a metal electrolysis electrode in series with a metal-semiconductor Schottky barrier. In such a system, the processes at the metal-semiconductor junction control the photovoltage and not the electrolytic reactions. In general, an applied bias is required to drive the water oxidation. In other cases, the metal can form an ohmic contact that may lead to loss of the photoactivity of the semiconductor. In discontinuous metal coatings, the electrolyte contacts the semiconductor, a situation which can lead to substantial photocorrosion, particularly in aqueous systems. For example, discontinuous gold films do not seem to protect n-type GaP from photocorrosion.

Corrosion-resistant wide band gap oxide semiconductor ($TiO_2$ and titanates mostly) coatings over narrow band gap n-type semiconductors such as GaAs, Si, CdS, GaP, and InP have been shown to impart some protection from photodecomposition. One of two problems is currently associated with the use of optically transparent wide band gap semiconducting oxide coatings: either a thick film blocks charge transmission or a thin film still allows photocorrosion.

Wrighton et al. (1978) have shown that chemical bonding of an electroactive group to an n-type semiconductor surface can reduce oxidative photocorrosion of the electrode during electrical power generation. However, the electroactive group consisted of ferrocene molecules which are not polymeric. When a polymeric material containing a catalyst has been covalently attached to the electrode surface, the polymer was not electrically conductive and the electrode was p-type. This distinction is important because with p-type electrodes, photodegradation by reductive processes is not a major problem in photoelectrochemical solar energy utilization. In the case of n-type and p-type semiconductors coated directly with thin catalytically active metal films for gaseous fuel production, the generally poor adherence of the metal to the semiconductor surface is a major impediment.

Charge conduction is generally much higher in electrically conductive polymers than in typical electroactive polymers. Accordingly, work on charge conductive polymers in the field of photoelectrochemistry has been directed towards stabilization of electrodes against photodegradation in electricity generating cells. Charge conductive polymers are known to protect certain semiconductor surfaces from photodecomposition by transmitting photogenerated holes in the semiconductor to oxidizable species in the electrolyte at a rate much higher than the thermodynamically favored rate of decomposition of the electrode. For example, R. Noufi, A. J. Frank, A. J. Nozik, *J. Am. Chem. Soc.*, 103,1849 (1981) demonstrated that coating n-type silicon semiconductor photoelectrodes with a charge conductive polymer, such as polypyrrole, enhances stability against surface oxidation in electricity generating cells. As also reported by R. Noufi, D. Tench, L. F. Warren, *J. Electrochem. Soc. Vol.* 127,2310 (1980), n-type GaAs has also been coated with polypyrrole to reduce photodecomposition in electricity producing cells, although the polymer exhibited poor adhesion in aqueous electrolyte.

Other work relating to the coating of electrodes with charge conductive polymers to prevent photodegradation thereof include U.S. Pat. No. 4,461,691, the contents of which are specifically incorporated herein by reference. Frank, et al. U.S. patent application Ser. No. 06/483,040, filed Apr. 17, 1983, now U.S. Pat. No. 4,476,003, also addresses the subject matter of coating photoelectrodes with organic conducting polymers for the purpose of decreasing photodegradation thereof. The contents of this latter patent are also hereby specifically incorporated herein by reference. Both referenced patents disclose the use of catalysts in conjunction with such charge conducting polymers overcoating a semiconductor electrode.

However, despite the promising use of polypyrrole either alone or in conjunction with catalysts on selected semiconductors to suppress photodecomposition thereof, the results obtained for preventing photodecomposition of the electrode in fuel and useful chemical generating cells having aqueous electrolytes have only been partially successful. Moreover, it can be seen that the discovery of uses for various polymer coatings on photoelectrodes has been on a case by case basis because of the empirical nature of the effects on any particular semiconductor and/or the interaction with any given electrolyte environment.

SUMMARY OF THE INVENTION

Accordingly, it is one object of the present invention to provide an electrode for use in photoelectrochemical cells having an aqueous electrolyte.

It is another object of the present invention to provide a photoelectrode adapted for reduced photodegradation in the aqueous environment of a photoelectrochemical cell.

It is yet another object of the present invention to provide an improved means for reducing the photodegradation of electrodes in photoelectrochemical cells having an aqueous environment.

Additional objects, advantages and novel features of the invention shall be set forth in part in the description that follows, and in part will become apparent to those skilled in the art upon examination of the following or may be learned by the practice of the invention. The objects and advantages may be realized and attained by means of the instrumentalities and in combinations particularly pointed out in the appended claims.

To achieve the foregoing and other objects and in accordance with the purpose of the present invention, as embodied and broadly described herein, an electrode is disclosed for use in photoelectrochemical cells having an electrolyte which includes an aqueous constituent. The electrode includes a semiconductor and a hydrophobic film disposed between the semiconductor and the aqueous constituent. The hydrophobic film is adapted to permit charges to pass therethrough while substantially decreasing the activity of the aqueous constituent at the semiconductor surface, thereby decreasing the photodegradation of the semiconductor electrode.

BRIEF DESCRIPTION OF THE DRAWINGS

The accompanying drawings which are incorporated in and form a part of the specification illustrate preferred embodiments of the present invention, and together with the description, serve to explain the principles of the invention. In the drawings.

DETAILED DESCRIPTION OF THE PREFERRED EMBODIMENTS

Figure 1:
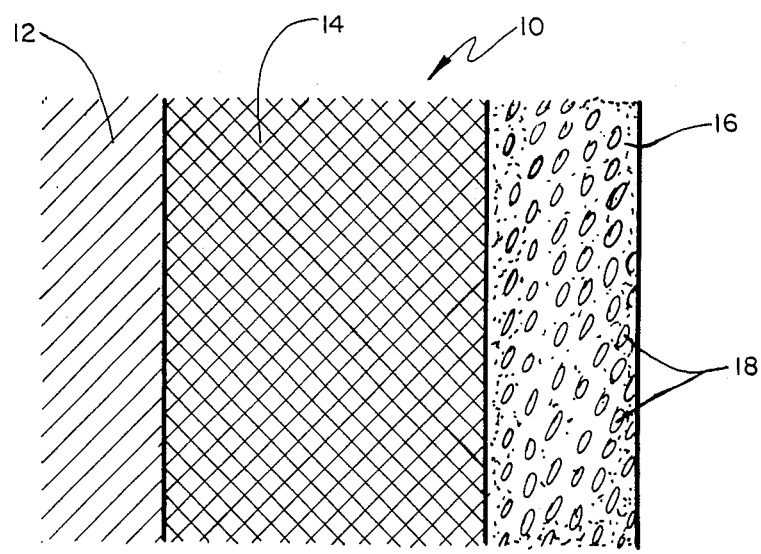
FIG. 1 is a schematic cross-sectional view of a photoelectrode which incorporates the present invention.

As previously indicated, surface modification of semiconductors with electrically conductive polymers is a potentially effective approach to rendering the semiconductor-electrolyte interface inert to photodegradation. As has been seen, surface coatings of polypyrrole have protected n-type semiconductors from photoanodic degradation during electrical power generation in aqueous solutions. Apparently, the high conductivity and large surface area due to the porous structure of such polymers enhance rapid charge transport from the semiconductor to redox species in the electrolyte before photocorrosion can occur. It has also been previously demonstrated that such highly conductive surface films when combined with a catalyst are effective in preventing the oxidation of certain semiconductors, such as CdS, in an aqueous solution. Still, these techniques have fallen short of the desired protection of photoelectrodes.

In light of the above, the present invention provides a means by which photoelectrodes can be adequately protected from photodegradation within a photoelectrochemical cell having an aqueous electrolyte. This protection is afforded by modifying the surface of the electrode with a hydrophobic film. Photodegradation occurs as a result of the reaction of photogenerated holes with the semiconductor surface lattice atoms, coupled with solvation effects. In general, photoexcited semiconductor electrodes undergo self oxidation in addition to, or even to the exclusion of, the oxidation of water. The arrangement of the present invention is designed to lower the water activity at the semiconductor surface, thereby reducing the free energy of solvation available for dissolution of the semiconductor crystal lattice. A key to the present invention, then, is that the water activity is reduced, while permitting the desirable redox reaction to take place.

As explained in detail in previously referenced U.S. Pat. No. 4,461,691, overlaying a semiconductor electrode with an organic conducting polymer may reduce the water activity at the semiconductor surface to some extent. Such organic conducting polymers also have other very beneficial effects with respect to fuel and useful chemical generating cells. The hydrophobic film of the present invention may be used with or without such organic conducting polymers. If used without any additional conducting polymer film, the hydrophobic film must either be sufficiently thin to permit charges to pass therethrough on their own or it must contain some type of conducting particles to conduct and pass the charges therethrough as discussed below. Alternatively, the hydrophobic film may itself be an organic conducting polymer thereby functioning in both capacities. In addition, catalysts in the form of charge conducting particles can be added to the surface of or intermixed integrally with the hydrophobic film to increase the charge conduction between the semiconductor and the electrolyte. When such a catalyst is present within the hydrophobic material of the invention, the hydrophobic material also functions to fix the catalyst to the photoelectrode.

The hydrophobic film of the present invention acts to decrease the amount of water actually reaching the semiconductor surface and to decrease the activity of the water which does reach the semiconductor surface so as to suppress the photodegradation of the semiconductor. This reduction of the water activity must take place without substantially affecting the desired redox reaction in the photoelectrochemical cell. The hydrophobic material can be any kind of hydrophobic material insoluble in water which may be formed into an adhesive thin film coatable on a semiconductor surface. Moreover, it must not significantly chemically react with the electrolyte solution so as to have a destructive, irreversible redox reaction in competition with the desired photoelectrochemical reactions, and it must show good transparency to band gap radiation. The hydrophobic film of one preferred embodiment is polystyrene. While there are many other materials which exhibit the characteristics outlined above and are suitable for use in the present invention, a few examples of such suitable hydrophobic films include diphenyl ether, any hydrophobic hydrocarbon material or any hydrophobic fluorocarbon material.

As previously indicated, the hydrophobic film of the invention may directly overlay the semiconductor. In one preferred embodiment, however, a charge conducting polymer film is interposed between the semiconductor and the hydrophobic film. In this preferred embodiment, the charge conducting polymer film works in conjunction with the hydrophobic film to synergistically lower the water activity at the semiconductor surface. Moreover, the charge conducting polymer film facilitates good electronic charge transport from the semiconductor to the electrolyte or any catalytic particles present within the electrode as discussed below. Additional details concerning such charge conductive polymers may be found in U.S. Pat. No. 4,461,691, which was previously specifically incorporated herein by reference. The hydrophobic material covering such charge conducting polymer films apparently slows the kinetics of semiconductor decomposition by functioning as an activation barrier for solvation and diffusion of large ions from the semiconductor, such as $Cd^{2+}$ from a CdS semiconductor electrode. The lowering of the water activity at the semiconductor surface by the combined polymer films (i.e. the charge conducting polymer film and the hydrophobic polymer film) work together to reduce the solvation energy for dissolution of the semiconductor crystal lattice.

As previously indicated, the hydrophobic film may be used with or without a redox enhancer. The term "redox enhancer" is used herein to mean any redox species associated with the polymer that serves to transmit photogenerated charges to the final charge-transfer reactions. For purposes of describing the present invention, the term "redox enhancer" is interchangeably used to generically describe catalysts and/or charge-relaying agents useful in the practice of the invention.

The redox enhancer is adapted for catalyzing certain of the chemical reactions within the photoelectrochemical cell as well as for substantially preventing any photogenerated holes and electrons from reacting with the charge conducting film if any is present. Moreover, if the redox enhancer is hydrophilic, it further functions to draw water into the hydrophobic polymer to thereby tie up the water. It is believed that this process forms microdroplets around the redox enhancer particles within the hydrophobic polymer, thereby helping to trap the water within the hydrophobic film and preventing it from reaching the semiconductor surface. Moreover, if the redox enhancer is also catalytic, this microdroplet formation assists in the catalyst's oxidation of water.

The catalyst may be embedded in particulate form within the hydrophobic film or it may be positioned on the exterior surface of the hydrophobic film. FIG. 1, as more specifically described below, illustrates this arrangement wherein the redox enhancer is in particulate form embedded within the hydrophobic film. In addition, the catalyst may be used with the hydrophobic film when the hydrophobic film is alone coating the semiconductor or when an organic conducting polymer film is present in addition to the hydrophobic film.

The redox enhancer, i.e., the catalysts and/or charge-relaying agents, used in the practice of the invention may be any of those known in the art. Examples of such redox enhancers are porphyrins, phthalocyanines, macrocyclic metallic complexes, organic dyes, coordination complexes, inorganics, and organometallics. The redox enhancer may also be present as particles (2 nm or less to about 300 nm) or larger (300 nm to 1 mm) in size. Representative materials for particles are transition metals, platinum, palladium, rhodium, rhenium, ruthenium, iridium and the oxides thereof, silicas, and zeolites. These same metals may also be present in various combinations or in supports (e.g., zeolites). The materials may also include semiconductors which may be light activated. The preferred catalysts to be used with the present invention are transition metals such as Pt black, Rh black, and $RuO_2$, with the Rh black being the most preferred of these three for the catalytic production of hydrogen from water.

It should also be noted that the amount of redox enhancer in the hydrophobic polymer film has an important effect on the electroactivity and catalytic effectiveness of the film. As described in more detail below, as the weight ratio of redox enhancer-to-hydrophobic polymer is increased, water penetration into the hydrophobic film increases particularly for hydrophilic redox enhancers. This relates to the microdroplets formation previously discussed. Moreover, the greater the ratio, the more this facilitates electron hopping between redox enhancer particles.

The charge conductive polymer film of the present invention, when present, also functions in part to provide a barrier against direct photodegradation or chemical degradation of the electrode. The term "charge conductive polymer" as used herein means polymers with an extended pi-bonded system. These include polymers which, by virtue of their chemical structure, have a backbone which permits charge conduction. Polymers of this type include polyacetylene-type polymers and poly(p-phenylene) type polymers, (i.e., derivatives of poly(p-phenylene) or poly(p-phenylene) sulfide) and the heterocyclic aromatic polymers with extended pi-bonding, (e.g., polypyrrole, poly(3, 4-dimethylpyrrole), poly(3-methylthiophene)). Also included are the phthalocyaninatometal polymers in which the central metal is a transition metal, (e.g., $Fe^{2+}$, $Co^{2+}$ and $Co^{3+}$) and the organic bridging ligands contain delocalized pi-electrons, (e.g., pyrazine, 4, 4'-bypyridine, and 1, 4-di-isocyanobenzene). Also included are the bridged-stacked phthalocyanines or metalophthalocyanines where pi-orbital overlap occurs at the phthalocyanine rings. Also included are charge conductive polymers derived from the addition of metals or graphite particles to organic polymers.

While the preferred embodiment includes an organic charge conducting polymer film overcoating the semiconductor junction and having its surface covered by a hydrophobic film, an alternate embodiment of the invention envisions the hydrophobic film functioning both as a hydrophobic film and as an organic charge conducting polymer. In other words, the organic conducting polymer film can be hydrophobic itself thereby obviating the need for an additional separate hydrophobic polymer film coating the surfaces thereof. However, the solvation effects must be balanced with kinetic considerations. One way to achieve this is with high charge conductivity with control over the water content of the hydrophobic charge conducting polymer. Examples of such hydrophobic charge conducting polymers include hydrophobic derivatives of polypyrrole such as poly(3, 4-dimethylpyrrole), poly(N-phenylpyrrole). Other examples of hydrophobic charge conducting polymer materials include phthalocyanines, metallophthalocyanines poly(p-phenylene sulfide) and poly(methylthiophene).

In the photoelectrochemical cells of the present invention, the n-p junction known in solid-state photovoltaic devices is generally replaced with an n-electrolyte-p (or metal) junction. Electron-hole pairs are generated by the absorption of light in either or both semiconductor electrodes. The electron-hole pairs are separated by the semiconductor-electrolyte junction barrier and are injected at the respective electrodes to produce electrochemical oxidation and reduction reactions. While the present description is in terms of a single band gap n-type and/or p-type material, as is known by those skilled in the art, the n-type electrode may consist of multiple layers or combinations of more than one band gap n-type material, and the p-type electrode may consist of multiple layers or combinations of more than one band gap p-type material. Such multiple layers or combinations of different band gap materials permit absorption of different wavelengths of light for better utilization of the solar spectrum.

There are certain considerations concerning the selection of electrodes for a photoelectrochemical cell consisting of a semiconductor anode, electrolyte and dark cathode. More details concerning such selections can be found in referenced U.S. Pat. No. 4,461,691. While single-crystal material may be employed for the electrodes, the electrodes of the invention may also be in the form of thin films (about 500 angstroms to 10 micrometers) and may be either polycrystalline, with a crystallite size ranging from about 25 angstroms to 1 mm, or amorphous. The polymer films may be conveniently fabricated by any technique known to the art including conventional deposition procedures such as DC sputtering, RF sputtering, chemical vapor deposition, thermal evaporation and anodization, or thermal oxidation of metals. Also included with the semiconductors useful in the practice of the present invention are particulate semiconductors ranging in size from about 2 nm or less, to 300 nm, or larger such as 300 nm to 1 mm.

n-Type materials useful in the present invention for the semiconductor electrode involve suitably doped semiconductors, multiple layers thereof, or combinations thereof, with band gaps between 0.5 and 3.0 eV including elements (e.g., Si, Se), transition metal oxide (e.g., $Fe_2O_3$, $Fe_2TiO_5$), II-VI Compounds, III-V Compounds, III-VI Compounds, mixed crystals of II-VI Compound, (e.g., $CdSe_xTe_{1-x}$), mixed crystals of III-V Compounds, IV-VI Compounds, I-III-VI$_2$ Compounds (e.g., $CuInSe_2$), II-IV-V$_2$ Compounds (e.g., $ZnSiP_2$), transition metal chalcogenides (e.g., $ZrS_2$, $MoS_2$, $WSe_2$), and various other ternary compounds where the Roman numerals refer to a group or groups of the Periodic Table of elements.

Preferred n-type semiconductors, multiple layers thereof, or combinations thereof, have band gaps ranging from about 0.5 to 2.5 eV and include Si, Se, $Fe_2O_3$, $Fe_2TiO_5$, $FeTiO_4$, $Hg_2Nb_2O_7$, $Hg_2Ta_2O_7$, CdS, CdSe, CdTe, GaP GaAs, InP, AlAs, AlSb, GaSb, HgS, $HfS_2$, $HfSe_2$, $MoS_2$, $MoSe_2$, $MoTe_2$, $PtS_2$, $RuS_2$, $TiS_2$, $WS_2$, $WSe_2$, $ZrS_2$, $ZrSe_2$, $CuInS_2$, $CuInSe_2$, $CdSe_xTe_{1-x}$, $CuInS_2$, $CuInSe_2$, $AgInS_2$, $AgInSe_2$, $ZnGeP_2$, $CdSiP_2$, $CdGeP_2$, and $CdSnP_2$.

p-Type materials useful in the present invention involve suitably doped semiconductors, multiple layers thereof, or combinations thereof, with band gaps between 0.5 and 3.0 eV, including the various elements specifically outlined and stated in U.S. Pat. No. 4,461,691.

The electrolyte utilized in a photoelectrochemical fuel generating cell must have a sufficiently high conductivity in order to minimize cell resistance and reduce energy losses. The electrolyte is conveniently an aqueous solution made appropriately neutral, acidic, or basic. By the term aqueous electrolyte it is meant any electrolyte having an aqueous constituent.

Solvents useful in forming electrolyte solutions for purposes of this invention should show good transparency to band gap radiation. Such solvents include water and solvents mixable with water such as alcohols and tetrahydrofuran. Sufficient conductivity of the solution may be provided by dissolving in the solvent a conductivity-supporting electrolyte such as tetrabutylammonium chloride, bromide, perchlorate, fluoroborate, lithium chloride, lithium perchlorate, and the like.

Referring now to FIG. 1, the preferred embodiment of the present invention is disclosed. In this embodiment, a photoelectrode 10 includes a semiconductor electrode material 12 which is preferrably CdS overlayed by a charge conducting polymer 14. In this preferred embodiment, the material 14 is an organic charge conducting polymer preferably polypyrrole. The exterior surface of the charge conducting layer 14 is coated by a hydrophobic material 16 which is preferably polystyrene. The polystyrene 16 is impregnated with particles of a catalyst 18 which preferably comprises Pt black, Rh black, or $RuO_2$, more particularly Rh black. In operation, upon illumination of the photoelectrode 10, the conductive polymer 14 channels photogenerated holes to the catalyst 18 in the hydrophobic film 16 before self oxidation of the semiconductor photoanode 12 occurs. The catalyst 18 then catalyzes the oxidation of water ($H_2O$) to oxygen ($O_2$). At the counter electrode (not shown), the cycle is completed with the evolution of hydrogen ($H_2$). The redox reaction taking place in such photoelectrochemical cells as well as the functioning of the photoelectrode 10 in general can be found in U.S. Pat. No. 4,461,691.

To more completely understand the functioning of the hydrophobic film within the present invention, one must understand the functioning of the conductive polymers, when present, in conjunction with the semiconductor and electrolyte. The conductive polymers useful in the practice of the present invention permit manipulation of the interfacial charge-transfer kinetics in a manner which suppresses photodecomposition and which promotes desirable redox reactions. In addition, conductive polymers useful in the practice of the present invention are polymers having good electronic transport properties at high solar intensities (e.g., about 80 to about 140 $mV/cm^2$). The conductive polymers of the present invention act to assist the hydrophobic film in channeling a high density of photogenerated minority carriers from the semiconductors to desirable redox species in the electrolyte at a rate greatly exceeding the rate of photodecomposition of the semiconductor. The polymers also are characterized by a large surface area whereby they can provide a mechanism for rapid charge transport from the semiconductor.

While not intending to be bound by this theory, it is believed that the specific interface energetics will depend on whether or not the redox electrolyte can penetrate the polymer films to the semiconductor, and more specifically it will depend on the activity of the water at the polymer semiconductor interface. If the polymer films are permeable to the electrolyte as in the case of polypyrrole films in water containing simple anions (e.g., $ClO_4^-$, $SO_4^{2-}$), rectification can be determined principally by the semiconductor-electrolyte junction. For this situation, protection of the semiconductor surface will hinge considerably on the good electronic transport properties of the polymers compared with the photodecomposition rate. In the present invention, a hydrophobic polymer is superimposed over the charge conductive polymer so that the hydrophobicity will reduce the solvation effects and thus shift the decomposition potential of the electrode to positive values and permit the desirable redox reaction to take place.

The following examples are provided by way of illustration only and are not to be deemed to be limiting in any manner.

EXAMPLE I

Figure 2:
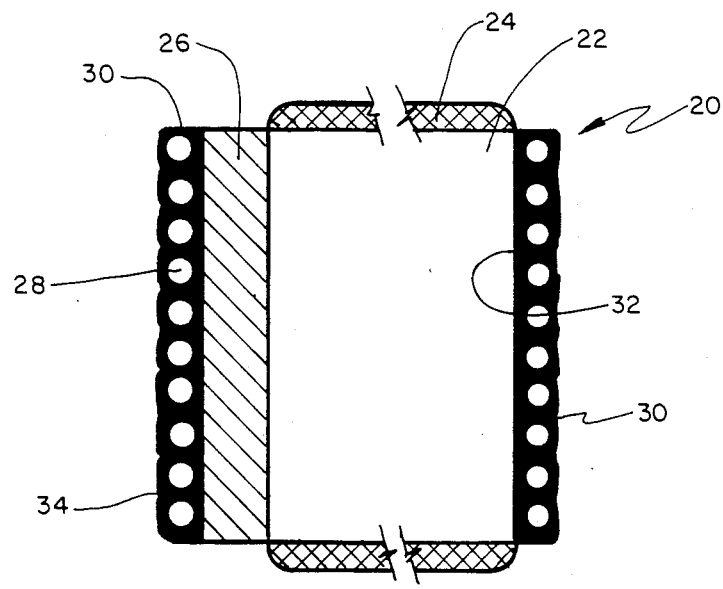
FIG. 2 is a schematic cross-sectional view of a photochemical diode incorporating the present invention and used to test the effectiveness of the invention.

Example I was designed to test the preferred embodiment of the present invention. FIG. 2 illustrates the photochemical diode 20 used in such testing. However, with respect to all examples illustrated herein, the following experimental procedure was followed. CdS photochemical diodes 22 and electrodes (Cleveland Crystals) were fabricated from 6.0 micrometers diamond-polished 4.8 mm diameter single crystalline circular plates (1–10 ohm-cm). Prior to use, the plates were etched in 25% HCl for 60 seconds and then rinsed with $H_2O$. The CdS diodes 22 were suspended in solution by a wire holder encased in polyethylene tubing. The edges of the crystals were insulated from contact with the electrolyte by heat-shrinkable tubing 24. In electrochemical experiments, ohmic contacts were made with a gallium-indium eutectic. The wire leads were encased in a glass tube for mounting on the exposed metal contacts and the edges of the crystal were insulated with the heat-shrinkable tubing 24. Only the less stable face of the crystal, which is predominately Cd atoms, was exposed to actinic light. The carbon electrodes (not illustrated) were made from pyrolytic graphite (Union Carbide) drilled out in 6 mm diameter disks and mounted as described above for the CdS electrodes. The bare face of the graphite was exposed to the electrolyte.

The procedure for electrosynthesis of polypyrrole on metal surfaces was adapted to photoelectrochemical systems. The thickness of the polypyrrole film 26 was measured with a Dektak surface profile system. To reduce the possibility of poisoning the catalysts, all chemicals were of high purity. The catalysts 28 included $RuO_2$ powder (Alpha Products), Pt black (Strem Chemicals), and Rh black (Alpha Products) immobilized in polystyrene films 30 (Polyscience MW 2,000,000). The catalyst-polystyrene mixtures were pipetted onto the surface of the substrate from a benzene solution and then air dried. In some experiments, the back surface 32 of the CdS crystals was loaded with metallic Pt by photoplatinization as follows: A CdS crystal which was modified on the front surface with a $RuO_2$-polystyrene film was immersed in a photolysis cell containing an aqueous solution of 0.2 mM $H_2PtCl_6$ at pH 2–3. The aqueous solution was purged with $N_2$ and the $RuO_2$-covered surface was irradiated with light (5 mW/cm$^2$) from a tungsten-halogen lamp for about 15 minutes. Most of the platinization of the crystal occurred on the face 32 opposite the side illuminated although small amounts of platinum deposits were evident on the illuminated front surface 34. The total amount of platinum deposited on the CdS crystal was ca.100 mg as determined from atomic absorption data of the change in Pt concentration as a result of the photoplatinization reaction.

The photochemical studies employed an air-tight 40 cc cell fitted with an optical window, and the cell generally contained 30 cc of solution. The optical train consisted of a 250 W tungsten-halogen lamp, 500 nm shortwave-pass interference filter, and three heat-reflectance mirrors which produced a band of radiation between 400 and 510 nm. The light intensity was adjusted to compensate for the light absorbed by the various coatings. The radiant power, after passing through the surface films, was 7.5 mW/cm$^2$. Electrochemical experiments were run in 2-compartment cells with 1-cm$^2$ fine-frit separators. The counter electrode was a platinum gauze and the reference was an SCE. Gas chromatography was used to monitor for $H_2$ and $O_2$ production from these experiments. The concentration of $Cd^{2+}$ ions produced during photocorrosion was determined by atomic absorption spectrophotometry.

Before the end product analysis for $Cd^{2+}$ ions, the following procedure was implemented to dissolve possible $Cd^{2+}$ ions and $Cd(OH)_2$ precipitates that may have formed on the surfaces of the CdS diode: after photolysis, the CdS crystal was transferred to an aqueous solution at pH 6, where the surface coatings of the CdS were removed by rubbing the faces of the crystal with a polyethylene rod. The resulting solution was then concentrated by evaporation. This solution and the photolyzed solution, which was acidified with perchloric acid to pH 3, were analyzed against standards for $Cd^{2+}$ ions.

Figure 3:
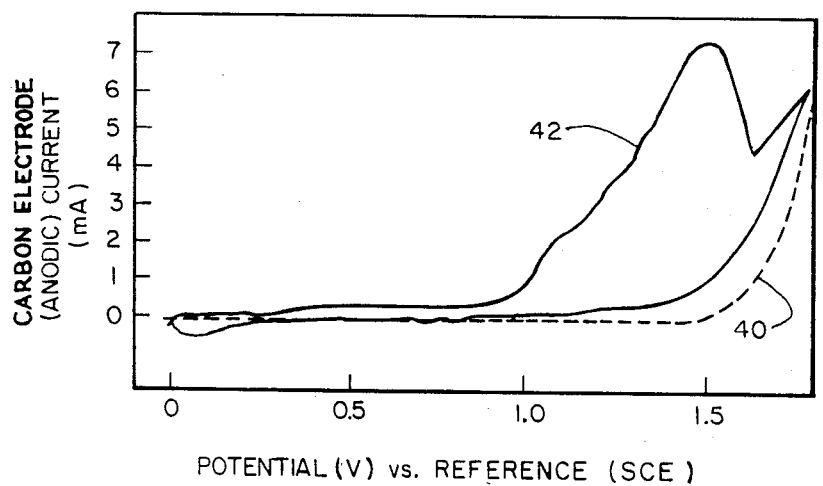
FIG. 3 is a graph illustrating the current-voltage characteristics of a bare graphite electrode and one constructed in accordance with the present invention.

In this Example I, a bare graphite electrode was tested and compared against another graphite electrode coated with polypyrrole and then overlayed with 100 micrograms of $RuO_2$ powder (360 micrograms/cm$^2$) dispersed in a 0.5 micrometer thick polystyrene film. The results of these tests can be seen in FIG. 3. The electrodes were immersed in aqueous solution at pH 7 with 0.5M $Na_2SO_4$. At this pH, the thermodynamic potential for the oxidation of water was +0.6 V (SCE). Because of the high overpotential for the oxidation of water at the bare graphite electrode (curve 40), little anodic current (less than 0.1 mA) was passed until the voltage exceeded 1.5 V. In contrast to this behavior, the graphite electrode coated in accordance with the present invention (curve 42) developed a current density of ca. 7.7 mA/cm$^2$ at 1.1 V. At this current density oxygen bubbles were evident on the electrode surface. At 1.5 V., the current density reached a value (ca. 27 mA/cm$^2$) where oxygen bubble formation disrupted the interface between the electrode and electrolyte. The current voltage behavior of the $RuO_2$-polystyrene coated graphite electrode is similar to that of an $RuO_2$ electrode with respect to the oxidation of the water.

EXAMPLES II–V

The amount of redox enhancer in the hydrophobic film has an important effect on the electroactivity and catalytic effectiveness of the hydrophobic film. Examples II–V illustrate this effect. Table III, illustrated below, shows the effect of film thickness on the current density for $RuO_2$-polystyrene coated graphite electrodes made in accordance with the procedure set forth in Example I. In Examples II–V, the amount of $RuO_2$ powder was kept constant and the weight ratio of $RuO_2$-to-polystyrene was altered. This corresponds with the ratio of redox enhancer-to-hydrophobic film. The relative current density associated with 0.5 micrometer thick polystyrene film (EX. II) is nearly double that of a 5.0 micrometer thick film (EX. III). However, when the weight ratio of $RuO_2$-to-polystyrene is held fixed and the thickness of polypyrrole is varied as in Examples IV and V, the current density associated with a 0.6 micrometer-thick polypyrrole film is about 30% higher than that for a 0.2 micrometer-thick film.

TABLE III

Effect of Film Thickness on Current Density[1]

| Example No. | Thickness (μm) Polystyrene[2] | Polypyrrole | Relative Current Density |
|---|---|---|---|
| II | 0.5 | — | 1.0 |
| III | 5.0 | — | 0.5 |
| IV | 0.5 | 0.2 | 1.1 |
| V | 0.5 | 0.6 | 1.4 |

[1]Graphite-coated electrode in aqueous solution at pH 11 with 1.0 M LiClO$_4$.
[2]100 μg $RuO_2$ powder (360 μg/cm$^2$) incorporated into polystyrene film.

Thus, when a hydrophobic film alone is used on the graphite electrode as in the Examples II and III, a higher ratio of redox enhancer-to-hydrophobic film results in an increase in current density. However, when an organic conducting polymer film barrier is interposed between the semiconductor electrode and the hydrophobic film as in Examples IV and V, just the opposite is true.

EXAMPLE VI

Figure 4:
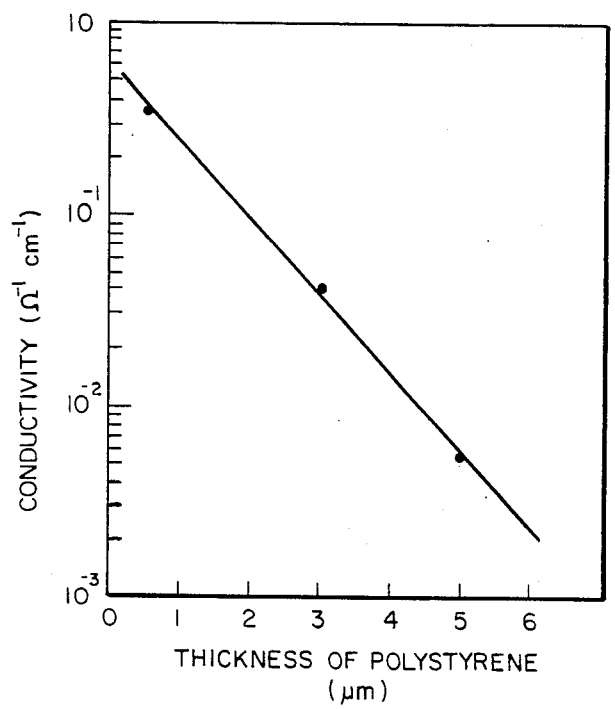
FIG. 4 is a graph illustrating the relationship between conductivity and the thickness of a catalyst-hydrophobic film layer constructed in accordance with the teachings of the present invention.

The increase in electroactivity of the $RuO_2$-polystyrene film can be understood from conductivity measurements of polystyrene at various catalyst metal loadings. The conductivity was measured by the 4-point probe method and the amount of the dispersed metal in the polystyrene film was held constant as the weight ratio of metal-to-polymer was varied. FIG. 4 shows a linear relationship between the log of the conductivity and the thickness of polystyrene films incorporating 100 micrograms $RuO_2$. As the thickness of polystyrene film increases from 0.5 to 5.0 micrometers at a fixed $RuO_2$ loading, the conductivity declines from 0.36 to 0.006 (ohm-cm$^{-1}$), a factor of 60. At the same weight ratio of metal-to-polymer but with smaller particles, the conductivity of a Pt black-charge 0.5 micrometer thick polystyrene film was two orders of magnitude higher than that of the $RuO_2$-loaded film.

The effects of varying the weight ratio of metal-to-polystyrene on the current density and conductivity of the films can be understood in terms of a conduction mechanism. Since undoped polystyrene is a very hydrophobic and insulating polymer, both the charge transport and the diffusion of water through the film must have very high activation barriers. The activation barriers are expected to decrease with an increase of the metal loading. More specifically, as the weight ratio of metal-to-polymer is increased, the average distance between the metal particles in the film must decline, thus facilitating electron hopping between nearest neighboring metal particles. Water penetration into the metallated polymer film is also expected to increase due to the presence of the hydrophilic metal oxide particles.

EXAMPLES VII–XV

In these particular Examples, the parameters of the conductive and catalytic films that affect the photostability of the semiconductor CdS and the production of hydrogen from the cleavage of water are illustrated and discussed. Table IV provides the results of Examples VII–XV which compare the product yields of various surface-modified CdS photochemical diodes constructed as in FIG. 2 and immersed in aqueous 1.0M $LiClO_4$ at pH 7.5 and 11 at 40 hours of illumination.

TABLE IV

Comparison of $H_2$ and Corrosion Product ($Cd^{2+}$) Yields from Various Surface-Modified CdS Photochemical Diodes at 40 hrs. Illumination

| Example No. | Coatings[a] Front Surface | Back Surface | Products in μmole $H_2$ | $Cd^{2+}$ | Conditions |
|---|---|---|---|---|---|
| VII | Bare | Bare | 0 | 0 | |
| VIII | Bare | Pt (0.5 μm PST) | 0.4 ($O_2$ uptake) | 0.1 | 1.0 M $LiClO_4$ |
| IX | $RuO_2$ (0.5 μm PST) | Pt (0.5 μm PST) | 0.6 | 0 | pH 11 |
| X | pp-$RuO_2$ (0.5 μm PST) | Pt (0.5 μm PST) | 2.6 | 0 | 25° |
| XI | pp-$RuO_2$ (5.0 μm PST) | Pt (0.5 μm PST) | 0.2 | 0 | |
| XII | pp-$RuO_2$ (0.5 μm PST) | InGa-Pt (0.5 μm PST) | 3.5 | 0.5 | |
| XIII | $RuO_2$ (0.5 μm PST) | Pt (0.5 μm PST) | 1.3 | 0.3 | 1.0 M $LiClO_4$ |
| XIV | $RuO_2$ (0.5 μm PST) | Pt (photo-deposition) | 2.7 | 0.1 | pH 7.5 |
| XV | $RuO_2$ (0.5 μm PST) | Rh (0.5 μm PST) | 4.9 | 0 | 25° |

[a]Abbreviations: polystyrene (PST); polypyrrole (pp)

The results of Table IV provide the production of $H_2$, which indicates proper functioning of the photoelectrochemical cells due to the cleavage of $H_2O$, and the production of $Cd^{2+}$, which indicates photocorrosion of the cadmium sulfide crystal. The greater the concentration of cadmium ions, the greater the photocorrosion. Comparing the results from Examples IX and X, it can be seen that when the hydrophobic polystyrene film with $RuO_2$ catalyst was used in conjunction with the polypyrrole charge conducting film, the production of $H_2$ yield quadrupled. When the amount of $RuO_2$ was held fixed and the thickness of the polystyrene overlayer was increased from 0.5 to 5.0 micrometers as in Example XI, the $H_2$ yield was reduced by an order of magnitude. In these Examples IX–XI, no photocorrosion was observed at the limit of detection for cadmium ions which was $10^{-6}$ m.

To facilitate electron transport to the Pt-polystyrene film, ohmic contact was made by painting the back surface of the crystal with an InGa alloy and overlaying it with the Pt-polystyrene mixture, Example XII. The front surface was similar to that of Example X. Compared with the results of Example X, the ohmic contact on the back surface of the CdS produced a 30% increase in the amount $H_2$ evolved over 40 hour period. However, since 0.5 micromoles $Cd^{2+}$ ions were produced and 3.5 micromoles $H_2$ were detected, only about 3.0 micromoles of $H_2$ can be attributed to the water-cleavage reaction with the remainder attributed to photocorrosion of the electrode.

The most effective catalytic film for water cleavage consisted of Example XV which included Rh black dispersed in polystyrene. 4.9 micromoles of $H_2$ were produced with no indication of CdS corrosion. The average size of the Rh black particles was between 0.25 and 0.5 micrometers with a contact area of ca. 70–80 $m^2/g$. With such a large surface contact area, the presence of an oxide layer on the Rh black particles was very likely and would therefore diminish its catalytic effect. The large contact area, however, also plays a role in the catalytic nature of the Rh black. Other factors such as the overpotential for $H_2$ production and absorption characteristics of the catalyst are also important. A less effective catalytic film resulted from photoplatinization of CdS where 2.7 micromoles of $H_2$ and 0.1 micromoles of cadmium ions were detected (Example XIV). The least effective hydrophobic/catalytic film for $H_2$ production and protection against photocorrosion consisted of 100 micrograms of Pt (560 micrograms/$cm^2$) in 0.5 micrometers thick polystyrene (Example XII). In this case 1.3 micromoles of $H_2$ and 0.3 micromoles Cd ions were detected. Moreover, this surface modified diode displayed less stability at pH 7.5 than at pH 11.2 (Example IX).

As can be seen from the above, surface modification of semiconductor electrodes with hydrophobic films is effective in the stabilization of the semiconductor against photodegradation during the cleavage of water. If a redox enhancer is added to the hydrophobic film and a charge conducting polymer is interposed between the hydrophobic film and the semiconductor electrode, even better results can be obtained in terms of preventing photodegradation of the semiconductor material in conjunction with production of hydrogen and oxygen during the cleavage of water. These films of hydrophobic material as well as charge conducting polymer substantially lower the water activity at the semiconductor surface and thus reduce the free energy of solvation for dissolution of the semiconductor crystal lattice. Moreover, the hydrophobic films are likely to slow the kinetics for decomposition by functioning as an activation barrier for solvation and diffusion of large ions such as cadmium ions and the like. The amount of the redox enhancer dispersed in the hydrophobic polymer films affects the charge transport and electroactivity of the polymer and consequently the stability and catalytic activity of the semiconductor electrode. These distinct advantages have significant potential applications to any photoelectrochemical cell having an electrolyte which contains an aqueous constituent. The photoelectrochemical generation of fuels and useful chemicals from water is highly important potential use of solar energy, and the present invention has shown to have significant potential impact on such systems.

The foregoing is considered as an illustrative only of the principles of the invention. Further, since numerous modifications and changes will readily occur to those skilled in the art, it is not desired to limit the invention to the exact construction and operation shown and described, and accordingly all suitable modifications and equivalence may be restored to within the scope of the invention as defined by the claims which follow.

The embodiments of the invention in which an exclusive property or privilege is claimed are defined as follows:

1. A photoelectrochemical cell for generating fuels and useful chemicals by certain chemical reactions, said photoelectrochemical cell comprising:
   a. an aqueous electrolyte including at least two different redox couples; and
   b. at least one photoelectrode, said photoelectrode comprising:
      (i) a semiconductor for producing photogenerated carriers;
      (ii) a charge conducting polymer film directly covering said semiconductor for substantially suppressing photodegradation of said semiconductor in said aqueous electrolyte resulting from a reaction of said photogenerated carriers with the semiconductor crystal lattice coupled with effects of solvation, said charge conducting polymer substantially suppressing said photodegradation by facilitating a transport of said photogenerated carriers from said semiconductor to said aqueous electrolyte so as to substantially prevent said photogenerated carriers from reacting with said semiconductors;
      (iii) a hydrophobic film covering with said charge conducting polymer for facilitating said suppressing of said photodegradation, said hydrophobic film facilitating said suppression of said photodegradation by allowing the transported photogenerated carriers to substantially freely pass through said charge conducting polymer, without inhibition and by reducing an amount of aqueous electrolyte arriving at the semiconductor surface, and by substantially decreasing an activity of said aqueous electrolyte actually reaching said semiconductor surfaces so as to substantially reduce the effects of said solvation; and
      (iv) at least one redox enhancer combined with said hydrophobic film for further facilitating said suppression of said photodegradation, said redox enhancer further facilitating said suppression of said photodegradation by effecting catalyzing fuel-producing chemical reactions, while substantially enhancing said transport of said photogenerated carriers from said semiconductor to said aqueous electrolyte so as to substantially assist preventing said photogenerated carriers from said reacting with said semiconductor, and wherein charge conductivity properties of both said charge conducting polymer and said redox enhancer in combination with properties of said hydrophobic film associated with causing said decreasing activity of said electrolyte at said semiconductor surface enable satisfactory suppression of said photodegradation in said photoelectrochemical cell for said generating fuels and useful chemicals.

2. The electrode as claimed in claim 1, wherein said at least one redox enhancer comprises a transition metal or oxide thereof and is incorporated within or attached to the surface of said hydrophobic film.

3. The electrode as claimed in claim 1, wherein said at least one redox enhancer is hydrophilic and adapted to draw water into said hydrophobic film.

4. The electrode as claimed in claim 1, wherein said charge conducting polymer film is selected from the group consisting of poly(N-phenylpyrrole), poly(p-phenylene) sulfide type polymers, poly(methylthiophene), poly(3, 4-dimethylpyrrole), poly(3-methylthiophene), phthalocyanines and metallophthalocyanines.

5. The electrode as claimed in claim 1, wherein said semiconductor comprises any semiconducting material capable of being photodegraded by contact with water in the presence of light.

6. The electrode as claimed in claim 1, wherein said hydrophobic film comprises a material which is insoluble in water, capable of being formed into a thin film coating on a semiconductor surface, incapable of reacting with the electrolyte solution to any significant extent to avoid destructive redox reactions in competition with desired photoelectrochemical reactions, and shows good transparency to bandgap radiation.

7. The photoelectrochemical cell as claimed in claim 1, wherein said at least two different redox couples are selected from the group consisting of (a) $H^+/H_2$ and $O_2/H_2O$, (b) $CO_2/HCOOH$ and $O_2/H_2O$, (c) $CO_2/HCHO$ and $O_2/H_2O$, (d) $CO_2/CH_3OH$ and $O_2/H_2O$, (e) $CO_2/CH_4$ and $O_2/H_2O$, (f) $N_2/NH_3$ and $O_2/H_2O$, and (g) $CO_2/C_6H_{12}O_6$ and $O_2/H_2O$.

8. The photoelectrochemical cell as claimed in claim 1, wherein said hydrophobic film comprises polystyrene, said charge conducting polymer film comprises polypyrrole, and said redox enhancer comprises a transition metal or oxide thereof.

9. The photoelectrochemical cell as claimed in claim 8, wherein said transition metal or oxide thereof is selected from the group consisting of Pt black, Rh black and $RuO_2$.

10. A process for substantially suppressing photodegradation in a photoelectrochemical cell for generating fuels and useful chemicals reactions, said process comprising:
    a. providing an aqueous electrolyte with at least two different redox couples;
    b. providing at least one photoelectrode that comprises a semiconductor for producing photogenerated carriers;
    c. providing a coating of a charge conducting polymer film directly on said semiconductor for substantially suppressing photodegradation of said semiconductor in said aqueous electrolyte resulting from a reaction of said photogenerated carriers with the semiconductor crystal lattice coupled with the effects of solvation, and wherein said charge conducting polymer said substantially suppresses said photodegradation by facilitating a transport of said photogenerated carriers from said semiconductor to said aqueous electrolyte so as to substantially prevent said photogenerated carriers from reacting with said semiconductor;
    d. providing a coating of a hydrophobic film on said charge conducting polymer for facilitating said suppressing of said photodegradation, wherein said hydrophobic film said facilitates said suppression of said photodegradation by allowing the transported photogenerated carriers to substantially freely pass through said charge conducting polymer, by reducing an amount of aqueous electrolyte arriving at the semiconductor surface and by substantially decreasing an activity of said aqueous electrolyte actually reaching said surface of said semiconductor, as to substantially reduces the effects of said solvation; and e. providing at least one redox enhancer for further facilitating said suppression of said photodegradation and combining said redox enhancer with said hydrophobic film to further facilitate said suppression of said photodegradation, wherein said redox enhancer further facilitates said suppression of said photodegradation by effecting catalyzing fuel-producing chemical reactions, while substantially enhancing said transport of said photogenerated carriers from said semiconductor to said aqueous electrolyte so as to substantially assist preventing said photogenerated carriers from reacting with said semiconductor, and wherein charge conductivity properties of both said charge conducting polymer and said redox enhancer are used in combination with properties of said hydrophobic film associated with causing said decreasing activity of said aqueous electrolyte at said semiconductor surface so as to provide satisfactory suppression of said photodegradation in said photoelectrochemical cell for said generating fuels and useful chemicals.

* * * * *